April 3, 1928.  
J. E. ESHBAUGH  
1,664,407  
AUTOMATIC PULSE, RESPIRATION, AND TEMPERATURE RECORDER  
Filed March 18, 1924   3 Sheets-Sheet 1
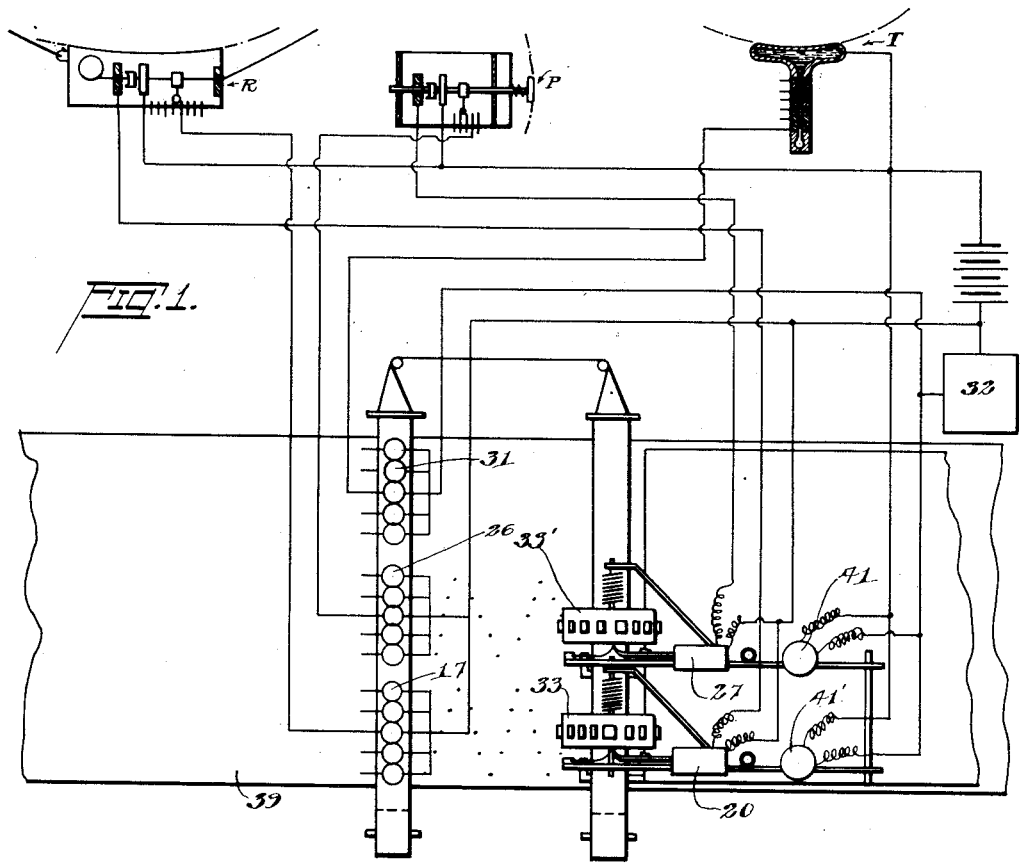
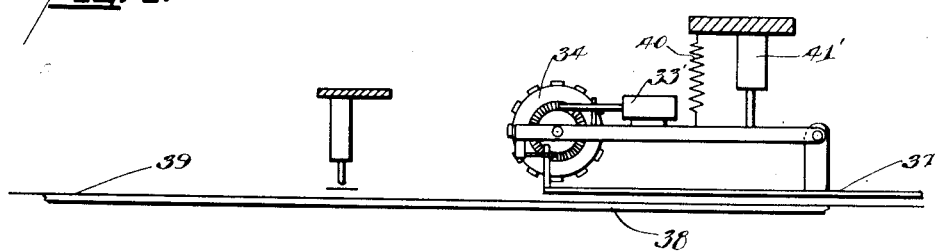
INVENTOR  
Jesse E. Eshbaugh  
BY Robert H. Young  
ATTORNEY April 3, 1928.  
J. E. ESHBAUGH  
1,664,407  
AUTOMATIC PULSE, RESPIRATION, AND TEMPERATURE RECORDER  
Filed March 18, 1924 3 Sheets-Sheet 2

INVENTOR
Jesse E. Eshbaugh
BY Robert H. Young
ATTORNEY

April 3, 1928.  
J. E. ESHBAUGH  
1,664,407  
AUTOMATIC PULSE, RESPIRATION, AND TEMPERATURE RECORDER  
Filed March 18, 1924  3 Sheets-Sheet 3
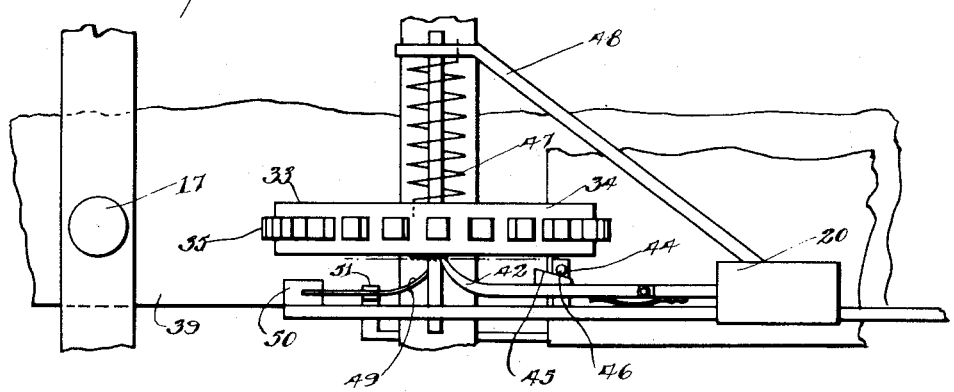
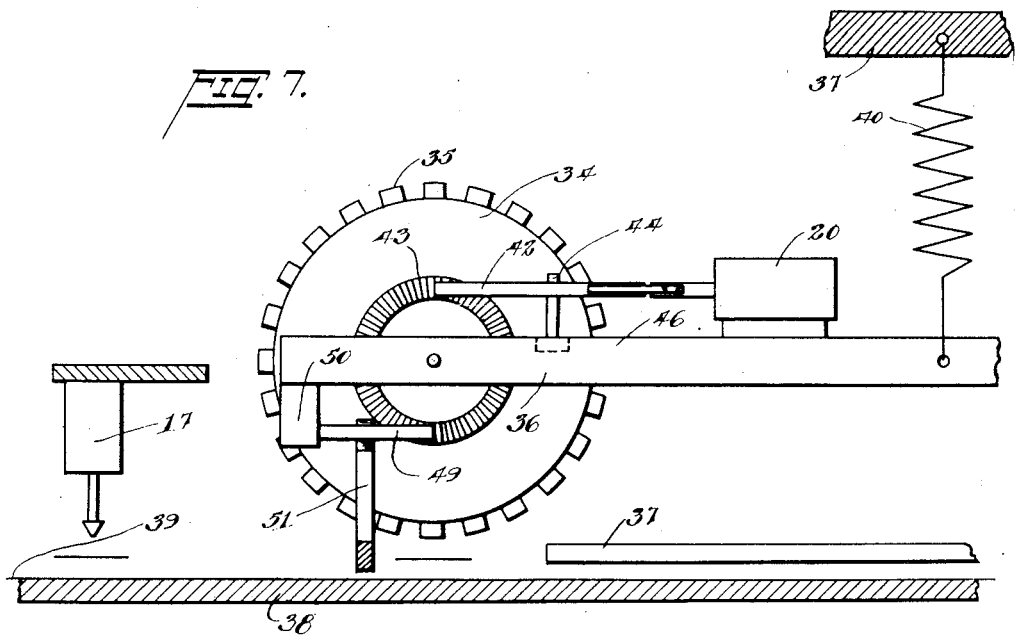
INVENTOR  
Jesse E. Eshbaugh  
BY Robert H. Young  
ATTORNEY Patented Apr. 3, 1928.

1,664,407

UNITED STATES PATENT OFFICE

JESSE EVERETT ESHBAUGH, OF DAYTON, OHIO.

AUTOMATIC PULSE, RESPIRATION, AND TEMPERATURE RECORDER.

Application filed March 18, 1924. Serial No. 700,092.

This invention relates to respiration, pulse, and temperature recording apparatus capable of use in various connections wherever it is desired to make graphic records of the physical well-being of an individual and here applied to use in making records of aviators while engaged in altitude flying or the like.

One of the principal objects of the invention is to provide an apparatus of this kind composed of compact control units applied to the person of the aviator and electrically connected with a recording mechanism remotely located in a convenient place in the fuselage and having a separate driving means in order not to require any physical exertion on the part of the aviator to operate the same.

Another object is to provide in an apparatus of this kind control units operated by the aviator by his respirations and pulsations and the degree of his temperature, which are so constructed that a graphic record is produced showing not only the regularity of these manifestations but also their extent and uniformity.

A still further object is to provide in connection with the control units and the recording mechanism a periodically operated means for totaling the pulse beats and respirations, and making a record of the temperature for successive periods as they elapse.

Figure 3:
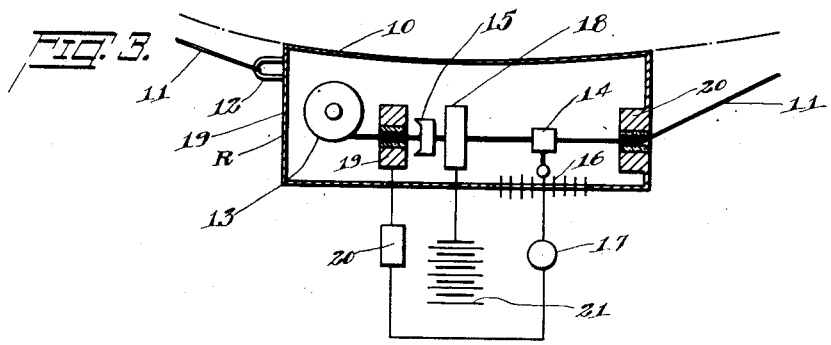
Figure 4:
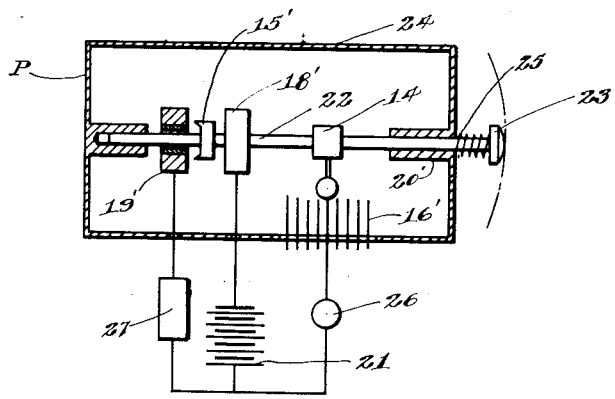
Figure 5:
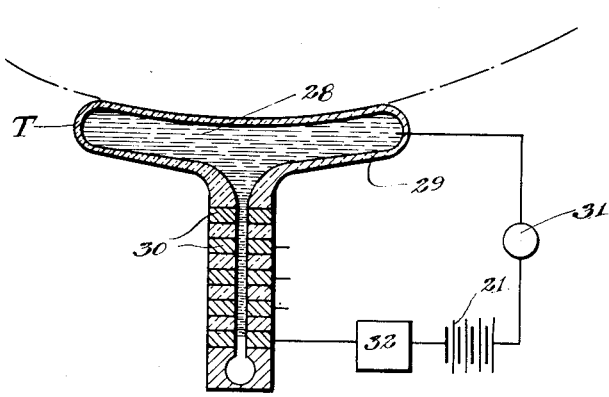

The invention is illustrated in the accompanying drawings in which Fig. 1 is a general diagrammatic plan view of the apparatus or system showing the electrical circuits therefor. Fig. 2 is a side view of Fig. 1. Fig. 3 is an enlarged view of the respiration unit, certain portions thereof being shown in a diagrammatic fashion. Figs. 4 and 5 are similar views of the pulse, and temperature units. Fig. 6 is a plan view and Fig. 7 a side view on an enlarged scale of one of the devices periodically operated to record the total number of respirations and pulsations. Throughout the views the same reference numerals are applied to the same parts.

Referring to the drawings, and for the present more particularly to Figs. 3 to 5 inclusive, the respiration unit of the apparatus is indicated generally by the reference character "R", the pulse unit by the reference character "P" and the temperature unit by the reference character "T". The unit "R" has a casing 10 of a convenient form and size to be comfortably carried upon the chest of the aviator and has extending from it a tape 11 which may be passed about the chest and have its end hooked or otherwise connected to the casing 10, as at 12. The tape 11 is wound upon a drum 13 in the casing 10, a spring or other means being provided to place a tension upon the tape so that it is wound and unwound during the respirations. The tape is preferably of a conducting material, such as piano wire of a sufficiently small gage to insure proper flexibility, and carries upon it contactor blocks 14 and 15, both of which are held by friction tightly enough to insure their moving with the tape and overcoming such slight resistance as is offered by the contacts with which they engage. The purpose of frictionally holding these blocks on the tape is to permit their adjustment when the unit is applied to different aviators having different chest measurements and different chest expansions. The contactor 14 has a brush moving over a series of contacts 16 spaced equal distances within the limits of the movements of the contactor. These contacts are each separately connected in order with solenoids 17 placed side by side in a row. The plungers of the solenoids 17 are in the form of dies to make suitable impressions on a record tape to give a graphic representation of the amplitude of the respirations and to indicate the uniformity thereof. The tape 11 is guided by passing through a lug 18 and in contact therewith inside the casing 10 and on either side of the lug 18 it passes through insulating bushings in lugs 19 and 20. The contactor 15 upon each respiration moves into engagement with the lug 19 which serves as a stop. The extent of the movement of the block 15 is limited so that even a very feeble respiration will produce the engagement thereof with the stop and a record of the aviator is secured even though he is in a weakened and faint condition. The contactor upon each engagement with the stop 19 completes a circuit through a solenoid 20 with which the stop is connected. The core of the solenoid 20, as will presently be described, operates to index a totaling device one unit for each respiration to record the number of respirations. It will, however, suffice at this point to note that both the solenoid 17 and 20 are connected with a common battery 21 and with the lug 18 through a common return. It is apparent that the amplitude of the respirations and the uniformity thereof are indicated by the action of the moving contactor 14 and that the number of such respirations are recorded through the action of the contactor 15.

The pulse unit "P", shown in Fig. 4, is quite similar in its operation and construction to the respiration unit "R" with the exception that in this case a plunger 22 is used instead of the tape 11, which is given reciprocating movement in the pulsations. The plunger has a pallet 23 bearing against the body over some pulse indicating artery, as for example in the arm or wrist, and projects from a casing 24 held in the member by an arm band or the like to move freely therewith. The plunger 22 reciprocates in a lug 18' in direct electrical conducting relation therewith. It is guided in lugs 19' and 20', the former of which has an insulating bushing to insulate the plunger from the lug. The contactors 14' and 15', similarly to the contactors 14 and 15, are held merely by friction on the plunger to move therewith but to be capable of adjustment where this is required when the device is applied to aviators having different physical characteristics. The plunger 22 is normally urged outwardly toward the body by a light spring 25 acting between the pallet 23 and lug 20' so that the plunger movements accurately reproduce the pulsations both as to uniformity and amplitude. The contactor 14' has a brush riding over a series of spaced contacts 16' connected in circuit in order with a row of solenoids 26. The cores of the solenoids 26 are in the form of dies for making suitable impressions on a record tape, similarly to the solenoids 17. The contactor 15' upon each pulsation engages the stop lug 19' to complete a circuit through a solenoid 27 which, similarly to the solenoid 20, operates to index a totaling device one unit for each pulsation to record the number of pulse beats. Both of the solenoids 26 and 27 are connected with the battery 21 and through a common return with the lug 18'. It is apparent that the arrangement affords a means for recording the strength, uniformity, and regularity of the pulse beats, and for recording the total number of pulse beats for successive intervals.

The temperature unit T, shown in Fig. 5, comprises a thermometer 28 having an enlarged pad portion 29 to be applied broadside over an area on the body at a point where the temperature fluctuations best indicate the physical well-being of the person. The capillary tube of the thermometer is fitted with contacts 30 at regularly spaced intervals which are connected in order with a row of solenoids 31 for recording the temperature of the person. The contacts are successively put in circuit as the mercury rises in the tube. The mercury in the pad 29 is connected with the battery 21, thus completing the circuit. A chronometric device indicated by the numeral 32, which will be more fully described hereinafter, is connected in circuit with the solenoids 31, the purpose being to make a record at predetermined successive intervals of the aviator's temperature.

Associated with the respiration and pulse units "R" and "P" are totalizing devices 33 and 33' which are identical in construction and operation and are controlled to be advanced one step each for each respiration and pulsation through the medium of solenoids 20 and 27 respectively. One of these devices is illustrated in Figs. 6 and 7. It comprises a disc 34 having a series of marking dies 35 bearing suitable indicia relative to the number of respirations or pulsations as the case may be.

The disc is supported upon the outer end of a rocker arm 36 the inner end of which is pivotally supported upon a platform 37 extending crosswise above a table 38 in spaced relation to the latter to permit the movement therebetween of a record tape 39. The arm 36 is normally held with the disc 34 in raised position by a tension spring 40. However, at predetermined intervals, the device 32 completes circuits through solenoids 41 and 41', for each of the index devices 33 and 33', to depress the discs against the action of the springs 40 and cause impressions to be made on the tape 39. The chronometric device 32 above referred to, may be of any suitable clock-operated or other suitable form. Such devices are well known and in general use and it is not deemed necessary to go into the details thereof. The solenoids 20 and 27 advance the discs through the action of pawls 42 pivotally connected to the outer end of the cores thereof, and normally urged inwardly so that the end thereof engages ratchet teeth 43 on the side of the disc 34. When the solenoid 20 is energized the core is expelled and the pawl 42 engages the ratchet teeth and advances the disc one step. Upon each energization of the solenoid the core thereof retracts and the pawl upon being withdrawn moves away from engagement with the ratchet 43 due to the engagement of a pin 44 with a cam surface 45 on the side of the pawl 42. The pin 44 may be conveniently supported by a lug 46 extending from the side of the rocker arm 36. The advancement of the disc 34 winds up a torsion spring 47 connected between the disc and an arm 48 on the rocker arm 36, serving as one of the trunnion supports for the disc 34. The disc is held in its intermediate advanced positions by a leaf spring 49, supported by a lug 50 on the end of the rocker arm 36. It will be seen that at the end of a given interval of time, upon the completion of the circuit through the solenoid 41 by the chronometric device 32, the impression made by the totaling device upon the tape 39 represents the total number of respirations, or pulsations as the case may be, of the aviator during that interval of time. Upon depression of the device the disc 34 is returned to zero position by the spring 47, the leaf spring 49 being moved out of engagement with the ratchet 43 as the die upon the disc engages the record tape. This is accomplished by a cam 51 supported conveniently by an arm extending from the platform 37. The relation of the cam to the leaf spring 49 is such that a die upon the disc 34 makes its impression on the tape at about the instant the disc is free to rotate back to its zero position.

Referring to Fig. 1 for a résumé of the various operations hereinbefore described, it will be seen that the units "R" and "P" are so connected with the battery 21 that the individual pulsations and respirations will be recorded on the tape 39 by the various solenoids positioned laterally thereof and that the total number of respirations and pulsations are accounted for by the devices 33 and 33' and properly recorded on the tape at predetermined successive intervals when the chronometric device 32 completes the necessary electrical circuits. The temperature unit "T" is connected so that the temperature is recorded on the tape only at intervals when the chronometric device completes the necessary electrical circuit. The chronometric device, it is understood, will complete the circuits to produce the recording of the respirations, pulse and temperature at the same instant. It is apparent that a tape made during the course of a flight of a particularly hazardous character, where it is important to have some indication of the physical well-being of the aviator, will adequately supply such information since the zig-zag curves formed by the series of dots made by the dies of the solenoids graphically indicate the uniformity and regularity of the respirations and pulsations and also their amplitude or strength. This informatioin, supplemented by the temperature record, gives a complete record of the aviator, accurately showing his physical condition throughout an extended period.

I claim:

1. A respiration recording device comprising a tape to pass around a person's chest, a self-acting take-up for said tape to wind up and let out the tape in the respirations, a contactor movable by said tape the amplitude of the respirations, contacts in the path of movement of said contactor, a record, and electrically-sensitive recording means connected in circuit with said contacts to make a graphic reproduction of the respirations on said record.

2. A respiration recording device comprising a tape to be passed about a person's chest, a spring-drum take-up to wind and unwind the tape in the respirations, a contactor held fixedly by friction on said tape to be adjustable relative thereto but movable in the operation of the tape, a series of contacts in the path of movement of said contactor, a record to receive graphic reproductions of the respirations, and recording devices spaced laterally relative to the tape electrically connected in order with said contacts for making impressions on said record.

3. A respiration recording device comprising a tape of conducting material to be passed about a person's chest, a drum take-up for said tape to wind and unwind the tape in the respirations, a contactor block held by friction on said tape to move therewith in its movement but adjustable relative to the tape, a series of contacts in the path of movement of said block, a record, a series of electrical recording devices connected in order with said contacts and spaced laterally relative to the record to make graphic impressions thereon, a second contact block held by friction on said tape to move therewith but slidable relative thereto for adjustment, a stop in the path of movement of said block, and a totaling device electrically connected with said stop and contact to be indexed one step each time said contact engages said stop upon each respiration to total the number of respirations.

4. A respiration recording device comprising a tape of conducting material to be passed about a person's chest, a drum take-up for said tape to wind and unwind the tape in the respirations, a contactor block held by friction on said tape to move therewith in its movement but adjustable relative to the tape, a series of contacts in the path of movement of said block, a record, a series of electrical recording devices connected in order with said contacts and spaced laterally relative to the record to make graphic impressions thereon, a second contact block held by friction on said tape to move therewith but slidable relative thereto for adjustment, a stop in the path of movement of said block, a totaling device electrically connected with said stop and contact to be indexed one step each time said contact engages said stop upon each respiration to total the number of respirations, and a chronometric device for causing the periodic depression of said totaling device to make graphic impressions of the total numbers of respirations on said record.

In testimony whereof I affix my signature.

JESSE EVERETT ESHBAUGH.